United States Patent
Van Den Donker et al.

(10) Patent No.: US 9,416,867 B2
(45) Date of Patent: Aug. 16, 2016

(54) PLANETARY GEAR STAGE WITH PLAIN BEARINGS AS PLANET BEARINGS AND USE THEREOF

(71) Applicant: ZF Wind Power Antwerpen N.V., Lommel (BE)

(72) Inventors: Michiel Van Den Donker, GM Best (NL); Roger Bogaert, Dendermonde (BE); Dirk Leimann, Edegem (BE)

(73) Assignee: ZF Wind Power Antwerpen NV, Lommel (BE)

( * ) Notice: Subject to any disclaimer, the term of this patent is extended or adjusted under 35 U.S.C. 154(b) by 0 days.

(21) Appl. No.: 14/398,132

(22) PCT Filed: Apr. 9, 2013

(86) PCT No.: PCT/EP2013/057345
§ 371 (c)(1),
(2) Date: Oct. 31, 2014

(87) PCT Pub. No.: WO2013/167332
PCT Pub. Date: Nov. 14, 2013

(65) Prior Publication Data
US 2015/0133260 A1     May 14, 2015

(30) Foreign Application Priority Data
May 8, 2012 (EP) .................................... 12167088

(51) Int. Cl.
*F16H 57/08* (2006.01)
*F16C 17/10* (2006.01)
(Continued)

(52) U.S. Cl.
CPC .............. *F16H 57/082* (2013.01); *F03D 15/00* (2016.05); *F16C 17/105* (2013.01); F16C 17/107 (2013.01); *F16C 17/18* (2013.01); *F16C 17/26* (2013.01); *F16C 33/122* (2013.01); *F16C 2361/61* (2013.01); *F16H 2057/085* (2013.01)

(58) Field of Classification Search
None
See application file for complete search history.

(56) References Cited

U.S. PATENT DOCUMENTS 4,428,689 A * 1/1984 Choate .................... F16C 33/20
                                                                  384/296
4,901,602 A * 2/1990 Matoba ..................... F16H 1/28
                                                                  475/331

(Continued)

FOREIGN PATENT DOCUMENTS

DE      2 240 154      2/1974
DE      24 42 588 A1      3/1976

(Continued)

OTHER PUBLICATIONS

European Search Report Corresponding to 12167088.9 mailed Sep. 5, 2012.

(Continued)

*Primary Examiner* — Colby M Hansen
(74) *Attorney, Agent, or Firm* — Davis & Bujold, PLLC; Michael J. Bujold (57) ABSTRACT

A planetary gear stage for a gearbox has a ring gear, a sun gear and a planet carrier for driving planet shafts. Each planet shaft has a planet gear with radial and axial contact surfaces and which is rotatably supported by a plain bearing arrangement. The bearing arrangement has two bushings fixed to the planet shaft. Each bushing is L-shaped in cross-section and has radial and axial contact surfaces. The bushings form a cross-sectional U-shape and are axially locked by abutments. At least part of the planet gear is located within the U-shape formed by the bushings. The plain bearing arrangement has a radial sliding support arranged between the radial contact surface of the bushings and the radial contact surface of the planet gear and an axial sliding support arranged between the axial contact surface of the bushings and the axial contact surface of the planet gears.

23 Claims, 9 Drawing Sheets

(51) Int. Cl.
*F16C 33/12* (2006.01)
*F16C 17/18* (2006.01)
*F16C 17/26* (2006.01)

(56) References Cited

U.S. PATENT DOCUMENTS

| | | | |
|---|---|---|---|
| 5,827,147 | A | 10/1998 | Stewart |
| 8,591,371 | B2 | 11/2013 | Dinter et al. |
| 8,840,521 | B2 | 9/2014 | Kari et al. |
| 2012/0114488 | A1 | 5/2012 | Giger |

FOREIGN PATENT DOCUMENTS

| | | |
|---|---|---|
| EP | 0 156 067 A1 | 10/1985 |
| EP | 1 488 139 B1 | 8/2006 |
| EP | 1 767 814 A2 | 3/2007 |
| EP | 2 383 480 A1 | 11/2011 |
| JP | 58-17244 A | 2/1983 |
| JP | 60-252845 A | 12/1985 |
| SU | 1090941 A | 5/1984 |
| WO | 2009/014110 A1 | 1/2009 |
| WO | 2009/141140 A2 | 11/2009 |
| WO | 2011/074332 A1 | 6/2011 |
| WO | 2011/127509 A1 | 10/2011 |

OTHER PUBLICATIONS

International Search Report Corresponding to PCT/EP2013/057345 mailed May 31, 2013.
Written Opinion Corresponding to PCT/EP2013/057345 mailed May 31, 2013.

\* cited by examiner

PLANETARY GEAR STAGE WITH PLAIN BEARINGS AS PLANET BEARINGS AND USE THEREOF

This application is a National Stage completion of PCT/EP2013/057345 filed Apr. 9, 2013, which claims priority from European patent application serial no. 12167088.9 filed May 8, 2012.

FIELD OF THE INVENTION

The present invention relates to a planetary gear stage for a gearbox for a wind turbine. More particular, the present invention relates to a planetary gear stage comprising plain bearings for rotatably supporting planet gears in the planetary gear stage.

BACKGROUND OF THE INVENTION

The wind turbine market is changing fast nowadays. There is a continuing demand for larger wind turbines being able to generate a higher number of megawatts of electricity, also referred to as multi-megawatt wind turbines. At the same time the requirements for reduction of size and weight of the turbines and their components become more and more important.

In wind turbines, typically a wind turbine rotor drives a low speed shaft of a gear transmission unit or gearbox, which transforms torque and speed of the rotor to the required torque and speed of an electrical generator. The increasing demand for multi-megawatt wind turbines puts a challenging pressure on new designs of components such as gearboxes for such wind turbines. This is because weight and cost of the wind turbine are to be kept as low as possible or at least within acceptable ranges, while at the same time it has to be made sure that the components can withstand high rotor loads being generated during operation of the wind turbine. One way of reducing the weight of components for the gearbox is by using less material and thus by making them thinner. This may give some kind of flexibility to these components. This flexibility may increase the possibility of deformation during operation of the wind turbine. This is because, during such operation, wind turbines and especially multi-megawatt wind turbines, create high dynamic forces to and speed variations in the gearbox. Because of that, loads and speeds during operation of the gearbox can differ from the design loads and speeds, i.e. from the predicted loads and speeds during design of the gearbox, and even reverse loads can occur. Because of these high specific forces and loads in gearboxes for wind turbines and the requirements with respect to weight of the gearbox as described above, when making the design of the gearbox, the possibility of potentially large deformations of, for example, the planet gears, should be taken into account.

In prior art designs, roller bearings have mostly been for supporting the planet gears. However, currently also the use of plain bearings as planet bearings has been studied.

In EP 2 383 480 a planetary gear unit for a wind turbine is described. The planetary gear unit comprises a sun gear, a ring gear and a planet carrier wherein a plurality of planet gears are bearing mounted on planet shafts. The planetary gear unit furthermore comprises a plurality of radial and axial plain bearings for supporting the planet gears. The radial plain bearings each comprise a bushing formed of a plain bearing material which is either mounted as an inner ring to the planet shaft or as an outer ring in a bore of a planet gear, whereby a corresponding outer ring or inner ring is formed respectively by the bore of the planet gears or by the planet shaft. The axial plain bearings each comprise a first bearing element formed of a plain bearing material which is provided on a contact surface between a planet carrier wall and a front side of a planet gear, either on the planet carrier wall or on the front side of the planet gear, and whereby a corresponding second bearing element is formed respectively by the front side of the planet gear or by the planet carrier wall.

The plain bearing arrangement described in EP 2 383 480 is limited to be used with a cage type planet carrier in which the planet gears are placed between two walls of the planet carrier and where these walls support the planet shafts on either side of the planet gears.

Furthermore, when using plain bearings for supporting planet gears, deformations of the planet gears as described above may be disadvantageous for these bearing arrangements. The plain bearing may wear-out locally, which may reduce its effectiveness and may even lead to failure of the bearing.

SUMMARY OF THE INVENTION

The present invention provides a planetary gear stage for a gearbox. The planetary gear stage comprises a sun gear, a ring gear and a planet carrier for driving at least three planet shafts each onto which at least one planet gear having a radial and an axial contact surface is rotatably mounted by means of a plain bearing arrangement. The plain bearing arrangement comprises two bushings fixedly connected to the planet shaft, each fixed bushing being L-shaped in cross-section and having an axial contact surface and a radial contact surface, the L-shaped bushings being mounted to form a cross-sectional U-shape and being locked in axial direction at both outer sides by an abutment. According to embodiments of the invention, the abutment may be formed by a part of the planet carrier and/or a part of the planet shaft and/or a separate locking mechanism such as e.g. a locking plate, a circlips or a nut. At least part of the planet gear is located within the U-shape formed by the L-shaped bushings. The plain bearing arrangement furthermore comprises a radial sliding support in between the radial contact surface of the fixed L-shaped bushings and the radial contact surface of the planet gear, and an axial sliding support between the axial contact surface of the fixed L-shaped bushings and the axial contact surface of the planet gears.

A planetary gear stage according to embodiments of the invention can be used with all kinds of planet carriers, such as for example a single flange planet carrier, a double flange planet carrier and a planet carrier with a back plate, e.g. bogie plate.

Furthermore, in a planetary gear stage according to embodiments of the present invention, the plain bearing arrangement can be used with any size of planet gears, because the L-shaped bushings can easily be adapted in size at their sides which are to be connected so as to form the U-shape, e.g. by grinding, or a spacer or a further bushing can be placed in between the L-shaped bushings.

Moreover, because the plain bearing arrangement comprises two L-shaped bushings, it can more easily adapt to deformations of the planet gear which may occur during operation of the gearbox in which the planetary gear stage is mounted, which leads to less wear and thus to a longer life time of the plain bearing arrangement.

According to embodiments of the invention, the contact surface angle of the axial contact surfaces of the fixed L-shaped bushings and the planet gear may be between −2.5° and +2.5°, for example between +0.2° and +2.5°, or between +0.5° and +1.5°.

The L-shaped bushings have a width and the planet shaft has a diameter and the ratio of the width of the L-shaped bushings and the diameter of the planet shaft may, according to embodiments of the invention, be equal to or larger than 0.3, and may, according to still further embodiments, for example, be equal to or larger than 0.5.

The L-shaped bushings may be fixed against rotation with respect to the planet shaft by means of a positioning element, such as for example a key provided in a keyway in the planet shaft.

According to embodiments of the invention, the two fixed L-shaped bushings may be fixedly connected together.

According to other embodiments of the invention, the plain bearing arrangement may furthermore comprise a spacer in between the two fixed L-shaped bushings.

According to still further embodiments, the plain bearing arrangement may furthermore comprise at least one further bushing in between the two fixed L-shaped bushings. According to embodiments of the invention, at least some of the L-shaped bushings and the bushings in between the L-shaped bushings may be fixedly connected together. According to other embodiments of the invention, in between a fixed L-shaped bushing and a neighboring bushing and/or in between two neighboring further bushings a spacer may be present.

According to embodiments of the invention, the radial sliding support may comprise a coating of plain bearing material provided on the radial contact surface of the L-shaped fixed bushings and/or on the radial contact surface of the planet gear.

According to other embodiments of the invention, the radial sliding support may comprise a radial plain bushing, such as for example a free-rotating bushing. According to embodiments of the invention, the at least one free-rotating bushing may be formed of a plain bearing material or may be formed of steel or of steel coated with a plain bearing material.

According to further embodiments of the invention, the axial sliding support may comprise a coating of plain bearing material provided on the axial contact surface of the fixed L-shaped bushings and/or on the axial contact surface of the planet gears.

The planet carrier may be a double flange planet carrier. A double flange planet carrier may also be referred to as cage-type planet carrier. In a cage-type or double flange planet carrier, the planet carrier has two walls in between which the planet gears are placed and where these walls support the planet shafts on either side of the planet gears. According to such embodiments, the abutments for locking the fixed L-shaped bushings in axial direction may be formed at one outer side by an abutment of the planet carrier and at the other outer side by a collar of the planet shaft.

According to other embodiments, the planet carrier may be a single flange planet carrier. In such case, the planet shaft may be integrally formed with the planet carrier. In case of a single flange planet carrier, the abutments for locking the fixed L-shaped bushings in axial direction may be formed by an abutment of the planet carrier and at the other side by a locking mechanism, such as for example a circlips, a locking plate or a nut.

According to still further embodiments, the planet carrier may comprise a backplate. The backplate may, for example, be a bogie plate. In such cases, the abutments for locking the fixed L-shaped bushings in axial direction may be formed at both outer sides by a locking mechanism, such as for example a circlips, a locking plate or a nut.

According to embodiments of the invention, on one planet shaft one, two or more than two planet gears may be rotatably mounted. In case more than one planet gear is provided on a same planet shaft, each of the planet gears is supported by its own plain bearing arrangement.

The present invention furthermore provides the use of a planetary gear stage according to the invention in a gearbox for a wind turbine.

The present invention also provides a gearbox for a wind turbine. The gearbox comprises at least one planetary gear stage according to embodiments of the invention. According to embodiments of the invention, the gearbox may furthermore comprise a parallel gear stage.

BRIEF DESCRIPTION OF THE DRAWINGS

It has to be noted that same reference signs in the different figures refer to same, similar or analogous elements.

DETAILED DESCRIPTION OF THE PREFERRED EMBODIMENTS

In the description different embodiments will be used to describe the invention. Therefore reference will be made to different drawings. It has to be understood that these drawings are intended to be non-limiting, the invention is only limited by the claims. The drawings are thus for illustrative purposes, the size of some of the elements in the drawings may be exaggerated for clarity purposes.

The term "comprising" is not to be interpreted as limiting the invention in any way. The term "comprising", used in the claims, is not intended to be restricted to what means is described thereafter; it does not exclude other elements, parts or steps.

The term "connected" as used in the claims and in the description is not to be interpreted as being restricted to direct connections, unless otherwise specified. Thus, part A being connected to part B is not limited to part A being in direct contact to part B, but also includes indirect contact between part A and part B, in other words also includes the case where intermediate parts are present in between part A and part B.

Not all embodiments of the invention comprise all features of the invention. In the following description and claims, any of the claimed embodiments can be used in any combination.

The present invention provides a planetary gear stage for a gearbox. The planetary gear stage comprises a sun gear, a ring gear and a planet carrier for driving at least three planet shafts each onto which at least one planet gear having a radial and an axial contact surface is rotatably mounted by means of a plain bearing arrangement. In case more than one planet gear is provided on a same planet shaft, each of the planet gears is supported by its own plain bearing arrangement. The plain bearing arrangement comprises:

two bushings fixedly connected to the planet shaft, each fixed bushing being L-shaped in cross-section and having a radial contact surface and an axial contact surface, the L-shaped bushings being mounted to form a cross-sectional U-shape and being locked at both outer sides by an abutment, and whereby at least part of the planet gear is located within the U-shape formed by the L-shaped bushings, a radial sliding support in between the radial contact surface of the fixed L-shaped bushings and the radial contact surface of the planet gear, and an axial sliding support between the axial contact surface of the fixed L-shaped bushings and the axial contact surface of the planet gear.

According to embodiments of the invention, the abutment for locking the mounted L-shaped bushings may be formed by a part of the planet carrier and/or a part of the planet shaft and/or a separate locking mechanism such as for example but not limited to a locking plate, a circlips or a nut.

It has to be noted that plain bearings may also be referred to as journal bearings, hydrodynamic bearings or sliding bearings.

The planetary gear stage for a gearbox according to embodiments of the invention is intended for use in a gearbox for a wind turbine.

A planetary gear stage according to embodiments of the invention can be used with all kinds of planet carriers, such as for example a single flange planet carrier, a double flange planet carrier and a planet carrier with a back plate, e.g. bogie plate.

Furthermore, in a planetary gear stage according to embodiments of the present invention, the plain bearing arrangement can be used with any size of planet gears, because the L-shaped bushings can easily be adapted in size at their sides which are to be connected so as to form the U-shape, e.g. by grinding, or a spacer or a further bushing can be placed in between the L-shaped bushings.

Moreover, because the plain bearing arrangement comprises two L-shaped bushings, it can more easily adapt to deformations of the planet gear which may occur during operation of the gearbox in which the planetary gear stage is mounted, which leads to less wear and thus to a longer life time of the plain bearing arrangement.

The present invention will hereinafter be described by means of different embodiments. It has to be understood that these embodiments are only for the ease of understanding the invention and are not intended to limit the invention in any way.

Figure 1:
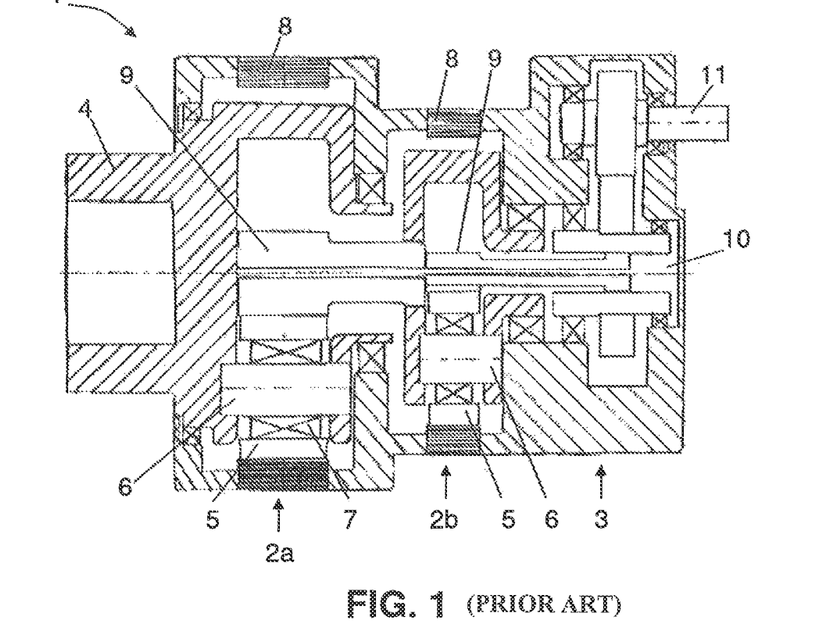
FIG. 1 schematically illustrates a gearbox for a wind turbine as known by a person skilled in the art.

FIG. 1 illustrates an example of a gearbox 1. The gearbox 1 comprises a first planetary gear stage 2a, a second planetary gear stage 2b and a parallel gear stage 3. The first and second planetary stages 2a, 2b comprise a planet carrier 4 and a plurality of planet gears 5 which are each rotatably mounted on a planet shaft 6 by means of a planet bearing arrangement 7. According to embodiments of the invention, the planet bearing arrangement 7 is formed by a plain bearing arrangement 7. The planetary gear stages 2a, 2b furthermore comprise a ring gear 8 and a sun gear 9. In the example given, the parallel gear stage 3 comprises a low speed shaft 10 and a high speed shaft 11.

It has to be understood that FIG. 1 is only for the ease of explanation and is not intended to limit the invention in any way. A planetary gear stage 2 according to embodiments of the invention may be used in any kind of gearbox known by a person skilled in the art. For example, gearbox 1 may also comprise only one planetary gear stage 2 or the parallel gear stage 3 may, besides a low speed shaft 10 and a high speed shaft 11, also comprise an intermediate shaft.

Figure 2:
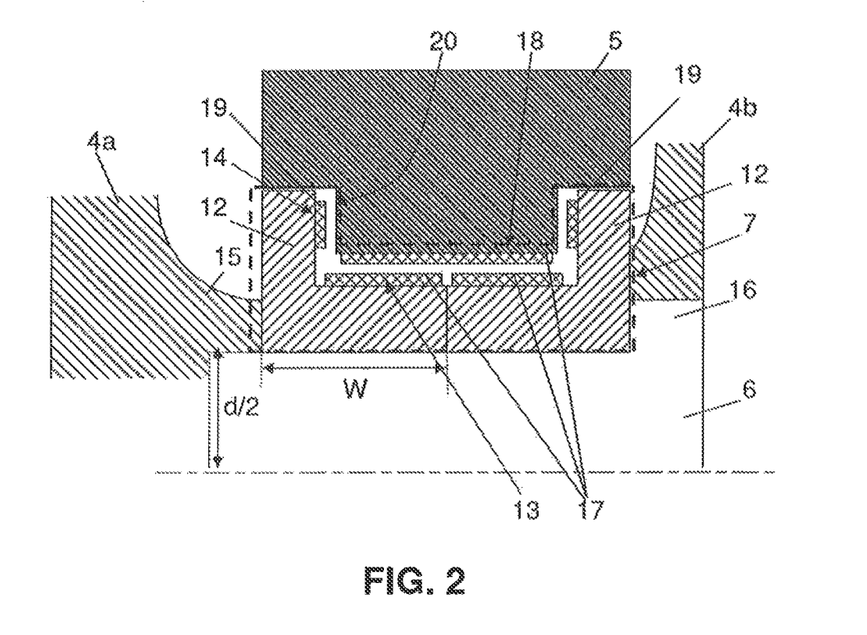
FIG. 2 schematically illustrates different implementations of bearing arrangements to be used with a planetary gear stage according to embodiments of the present invention.
Figure 3:
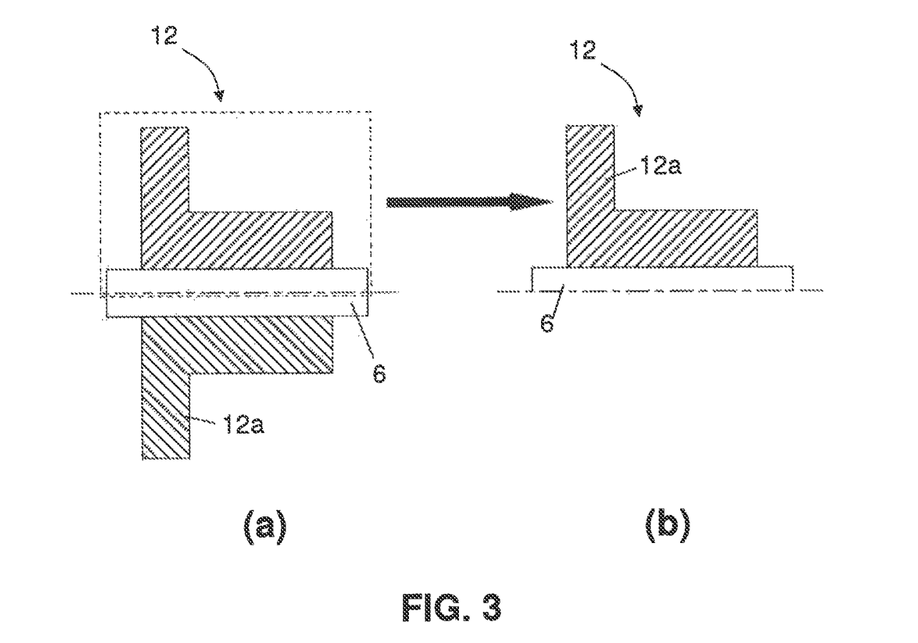
FIG. 3 and FIG. 4 respectively and schematically illustrate the L-shaped bushings and their mounting to form a U-Shape.

The present invention relates to the planetary gear stage 2. More particularly, the present invention relates to a concept for rotatably mounting planet gears 5 on their planet shaft 6 by means of a plain bearing arrangement 7. FIG. 2 illustrates a first embodiment of a plain bearing arrangement 7 according to embodiments of the invention. The plain bearing arrangement 7 comprises two bushings 12 fixedly connected to the planet shaft 6. Each fixed bushing 12 has, in cross-section, an L-shape. In the further description and in the claims these bushings 12 will be referred to as fixed L-shaped bushings 12. FIG. 3 schematically illustrates and clarifies what is meant with L-shaped bushings. In fact, the bushings 12 used in a bearing arrangement according to embodiments of the present invention are flanged bushings 12, i.e. bushing having a flange 12a at one side. This is illustrated in FIG. 3(a), which shows a cross section of the flanged bushing 12. When considering only the upper half or only the lower half of this cross section (see FIG. 3(b)), this flanged bushing 12 has an L-shape. So, whenever in the further description and/or the claims is referred to an L-shaped bushing, a flanged bushing is meant as illustrated in FIG. 3(a).

Figure 4:
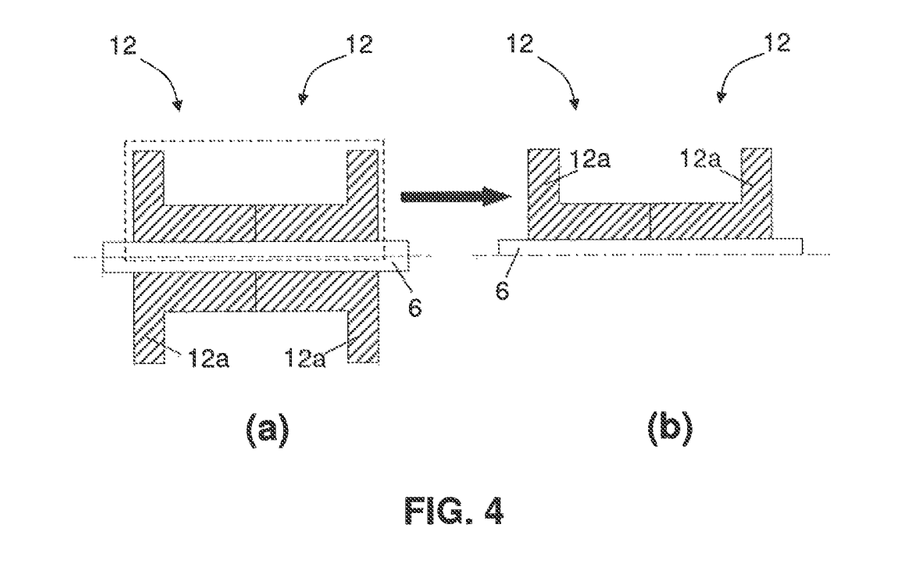

Each of the fixed L-shaped bushings 12 has a radial contact surface 13 and an axial contact surface 14. The fixed L-shaped bushings 12 are mounted to form, in cross-section, a U-shape. This is schematically illustrated and clarified in FIG. 4. The flanged bushings 12 are mounted together at a side opposite to the side having the flange 12a as can be seen in FIG. 4(a). In other words, the flanged bushings 12 are mounted such that their flanges 12a are located as far as possible from each other. When considering only the upper half or only the lower half of this cross section (see FIG. 4(b)), the L-shaped bushings 12 are mounted together to form a U-shape. Hence, whenever in the further description and/or the claims is referred to the L-shaped bushings 12 being mounted together to form a U-shape, the design as illustrated in FIG. 4(a) is meant.

In the example given, the planet carrier 4 is a cage-type planet carrier, also referred to as a double flange planet carrier. This cage-type planet carrier has two walls 4a, 4b. The planet gears 5 are placed in between these two walls 4a, 4b which in turn support the planet shafts 6 on either side of the planet gears 5. In the example given, the abutment for locking the L-shaped bushings 12 is formed at one outer side by an abutment 15 of the planet carrier 4 and at the other outer side by a collar 16 of the planet shaft 6.

At least part of the planet gear 5 is located within the U-shape formed by the fixed L-shaped bushings 12. In the example given in FIG. 2, the shape of the planet gear 5 is such that only part of the planet gear 5 is located within the U-shape formed by the fixed L-shaped bushings 12. According to this example, the planet gear 5 has a smaller part and a broader part, the smaller part being located within the U-shape formed by the fixed L-shaped bushings 12. An advantage hereof is that still the full width of the planet gear 5 can be used while the planet carrier 4 can be made smaller than in case the planet gear would have a width equal to the widest part of the planet gear 5 as illustrated in FIG. 2 and the bearing would have to be designed around the planet gear. When the planet carrier 4 can be made smaller in size, it is less prone to deformations, which is highly advantageous for the plain bearing arrangement, in terms of wear and thus life time.

Each of the L-shaped bushings 12 has a width W and the planet shaft 6 has a diameter d (in the drawings only d/2 is shown). According to embodiments of the invention, the ratio of the width W of the L-shaped bushings 12 and the diameter d of the planet shaft 6 may be equal to or larger than 0.3, or in other words W/d 0.3. For example, the ratio of the width W of the L-shaped bushings 12 and the diameter d of the planet shaft 6 may be equal to or larger than 0.5 or in other words W/d 0.5.

The plain bearing arrangement 7 furthermore comprises a radial sliding support 17 in between the radial contact surface 13 of the fixed L-shaped bushings 12 and a radial contact surface 18 of the planet gear 5 and an axial sliding support 19 between the axial contact surface 14 of the fixed L-shaped bushings 12 and an axial contact surface 20 of the planet gear 5.

In the example given the radial sliding support 17 may be formed by a coating 17 of a plain bearing material provided on both the radial contact surface 13 of each of the fixed L-shaped bushings 12 and on the radial contact surface 18 of the planet gear 5. However, according to other embodiments of the invention but not shown in the drawings, a plain bearing material 17 may be provide on only one of the radial contact surface 13 of the fixed L-shaped bushings 12 or the radial contact surface 18 of the planet gear 5.

Figure 5:
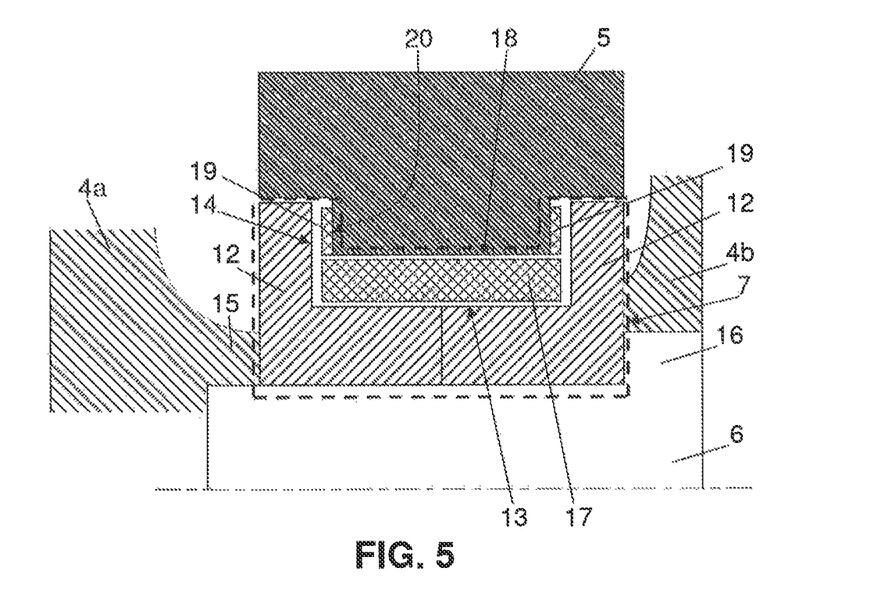
FIG. 5 to FIG. 17 schematically illustrate different implementations of bearing arrangements to be used with a planetary gear stage according to embodiments of the present invention.

According to further embodiments, and as illustrated in FIG. 5, the radial sliding support 17 may be formed by a radial plain bushing 17, more particularly by a radial plain bearing 17. According to embodiments of the invention, the radial plain bearing 17 may be formed by at least one free-rotating or floating bushing 17 (see FIG. 5). With free-rotating or floating bushing is meant that the bushing is at none of its sides connected in any way to another part of the bearing arrangement 7. According to embodiments of the invention, the free-rotating bushing 17 may be formed completely of a plain bearing material. According to other embodiments of the invention, the free-rotating bushing 17 may be formed of steel or may be formed of steel coated with a plain bearing material.

The axial sliding support 19 may be formed by a coating 19 of a plain bearing material provided on the axial contact surface 14 of the fixed L-shaped bushings 12 and/or on the axial contact surface 20 of the planet gear 5. In the example illustrated in FIG. 2, a coating 19 of a plain bearing material is provided only on the axial contact surface 14 of the fixed L-shaped bushings 12. In the example given in FIG. 5, a coating 19 of a plain bearing material is provided only on the axial contact surface 20 of the planet gear 5. Also, according to further embodiments of the invention but not illustrated in the drawings, the coating 19 of plain bearing material may be provided on both the axial contact surface 14 of the fixed L-shaped bushing 12 and the axial contact surface 20 of the planet gear 5.

Also in the example given in FIG. 5, similar as for the example illustrated in FIG. 2, the planet gear 5 has a shape adapted such that part of the planet gear 5 is located within the U-shape formed by the fixed L-shaped bushings 12, more particularly the planet gear 5 has a smaller part and a broader part, the smaller part being located within the U-shape formed by the fixed L-shaped bushings 12.

Figure 6:
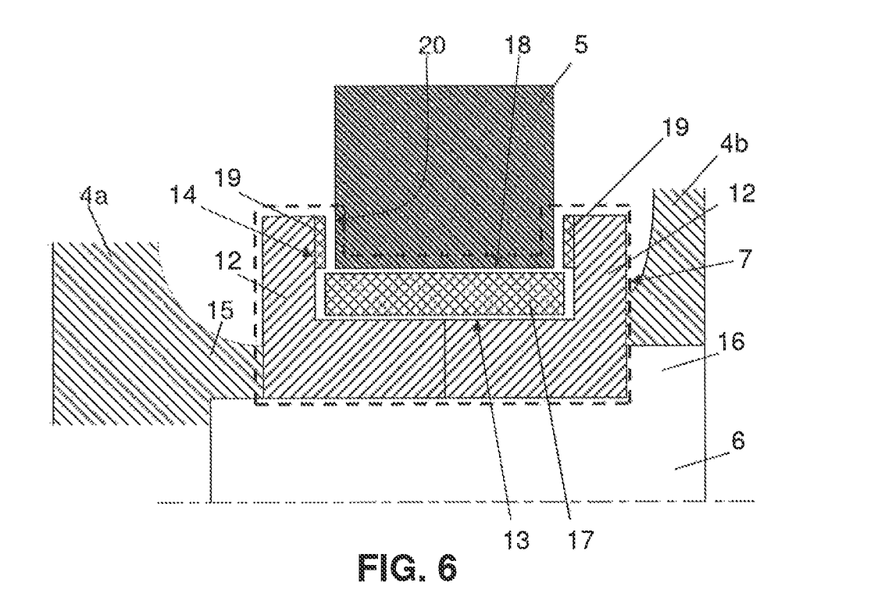
Figure 7:
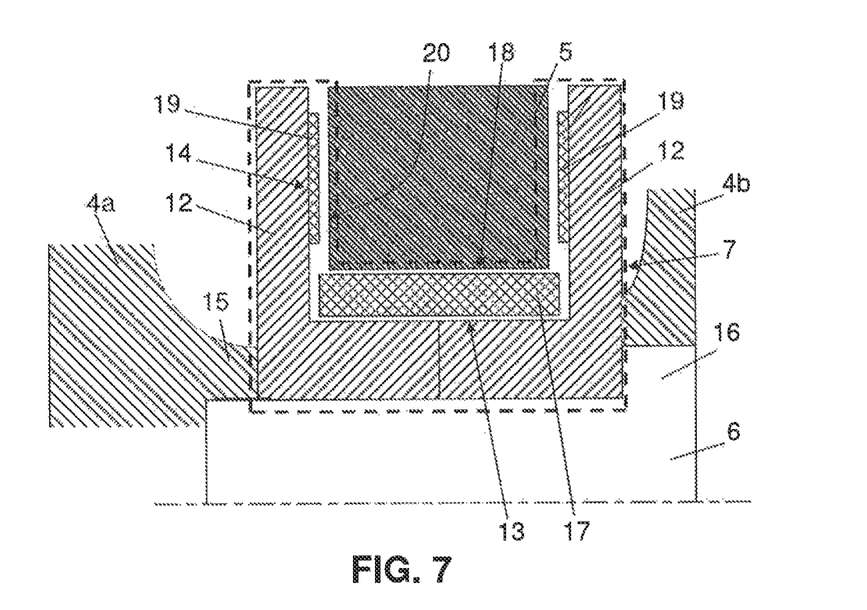

In FIG. 6 and FIG. 7, an alternative implementation of a plain bearing arrangement 7 according to the present invention is illustrated. According to these embodiments, the planet gear 5 is also at least partly located within the U-shape formed by the two fixed L-shaped bushings 12, or in other words at least part of the planet gear 5 is located within the U-shape formed by the two fixed L-shaped bushings 12. However, in FIG. 6 and FIG. 7 the planet gear 5 does not comprise two parts with different width as is the case in the examples illustrated in FIG. 2 and FIG. 5, but in the present example the width of the planet gear 5 is such that it fits within the U-shape formed by the two fixed L-shaped bushings 12. In FIG. 6 the planet gear 5 is partly located within the U-shape formed by the two fixed L-shaped bushings 12, while in FIG. 7 the planet gear 5 is fully located within the U-shape formed by the two fixed L-shaped bushings 12.

Further, according to the embodiments illustrated in FIG. 6 and FIG. 7 the axial sliding support 19 is provided as a coating 19 of plain bearing material at the axial contact surface 20 of the fixed L-shaped bushings 12. It has to be understood that this is not intended to limit the invention in any way, but is only for the ease of explanation.

Figure 8:
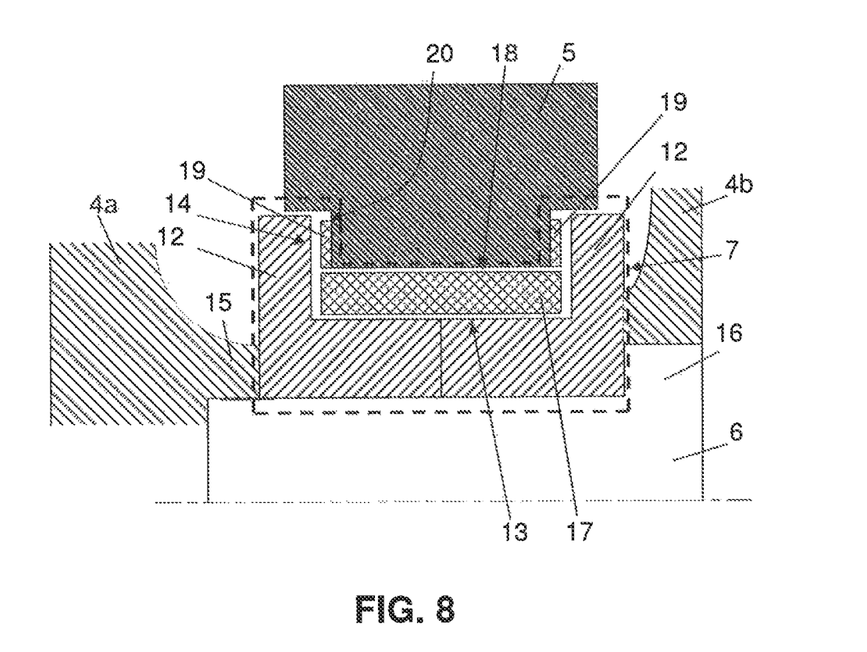

FIG. 8 illustrates a further embodiment of the invention. Part of the planet gear 5 is located within the U-shape formed by the two fixed L-shaped bushings 12. According to this embodiment, similar as for the embodiment illustrated in FIG. 2 and FIG. 5, the planet gear 5 has a smaller part and a broader part and the smaller part is located within the U-shape formed by the fixed L-shaped bushings 12. However, what is different from this embodiment with respect to the embodiment illustrated in FIG. 2 and FIG. 5, the broadest part of the planet gear 5 is smaller than the total width of the two fixed L-shaped bushings 12 when mounted to form a U-shape, or in other words, the broadest part of the planet gear 5 is smaller than the total width of the U-shape.

Figure 9:
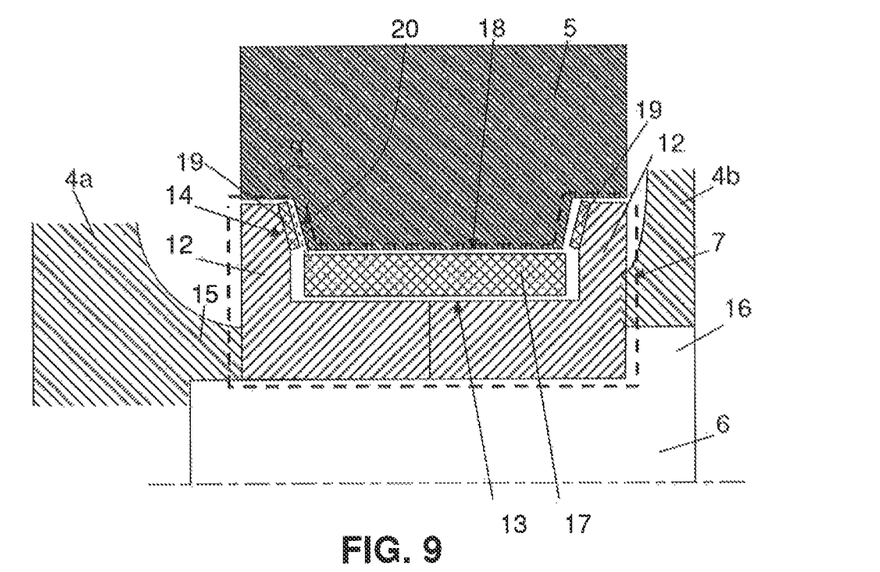

According to further embodiments and as illustrated in FIG. 9, instead of the axial contact surface 20 of the planet gear 5 being substantially perpendicular to a radial contact surface 18 of the planet gear 5 as was the case in the previous examples, the axial contact surface 20 of the planet gear 5 may deviate from the perpendicular direction. This is indicated with the contact surface angle $\alpha$, as is indicated in FIG. 9. According to embodiments of the invention, the contact surface angle $\alpha$ of the axial contact surface 20 of the planet gear 5 may be between $-2.5°$ and $+2.5°$, for example between $+0.2°$ and $+2.5°$ or $+0.5°$ and $+1.5°$. Similarly, the axial contact surface 14 may have a contact surface angle $\alpha$ of between $-2.5°$ and $+2.5°$, for example between $+0.2°$ and $+2.5°$ or $+0.5°$ and $+1.5°$. This provides a way of handling materials in a more economical way. In other words, slightly tilting the axial contact surfaces 14, 20 of the L-shaped bushings 12 and the planet gear 5 provides improved support capabilities of the material of which the L-shaped bushings 12 and the planet gear 5 are formed, which allows using cheaper material for these components.

Figure 10:
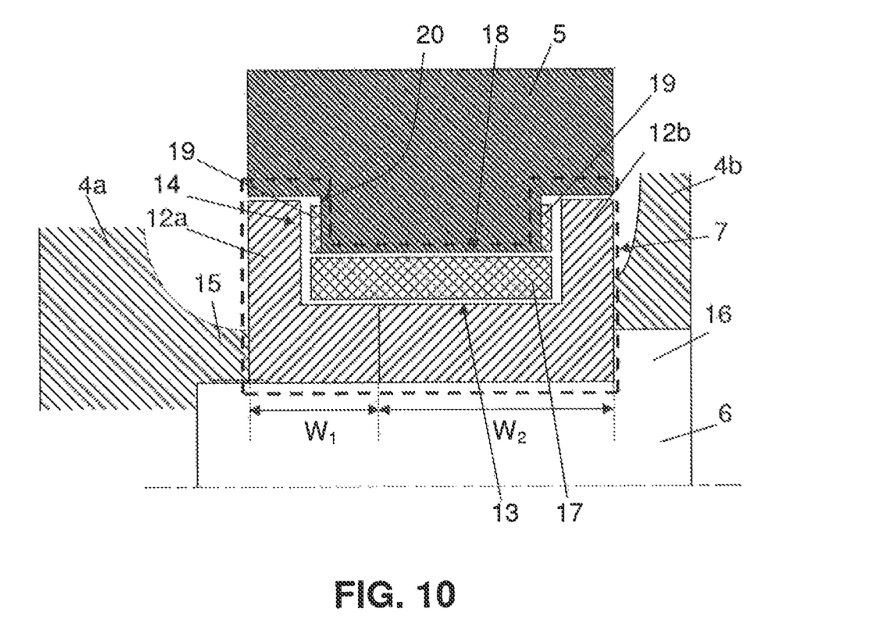

According to a further embodiment which is illustrated in FIG. 10, instead of the L-shaped bushings 12 being identical or symmetrical and thus having a same width W, the L-shaped bushings 12 may also be asymmetrical or different from each other. Consequently, according to the present embodiment the L-shaped bushings 12 may have a different width. Or in other words, a first L-shaped bushing 12a may have a first width $W_1$ and a second L-shaped bushing 12b may have a second width $W_2$, the first width $W_1$ being different from the second width $W_2$.

Figure 11:
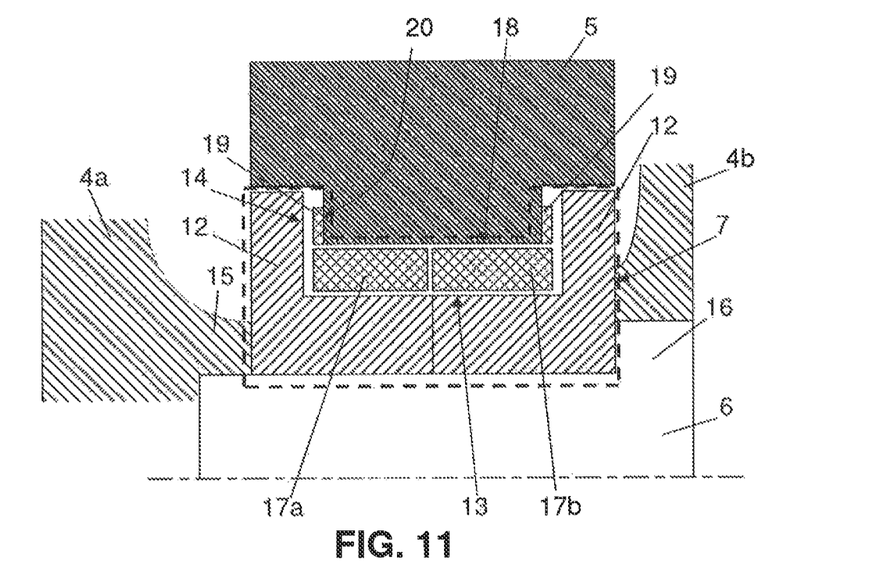

In the examples described above with respect to FIG. 5 to FIG. 10, one free-rotating or floating bushing 17 is provided as a radial sliding support. However, according to further embodiments of the invention, the radial sliding support 17 may comprise more than one free-rotating or floating bushing 17. FIG. 11 illustrates an embodiment of a plain bearing arrangement 7 in which the radial sliding support 17 is formed by two free-rotating or floating bushings 17a, 17b. These free-rotating or floating bushings 17a, 17b are located next to each other in a direction along the planet shaft 6. It has to be noted that the example given in FIG. 11 is not intended to limit the invention in any way, according to further embodiments of the invention the radial sliding support 17 may be formed of any suitable number of free-rotating or floating bushings 17 and in combination with all other features as described in other embodiments according to the present invention.

Figure 12:
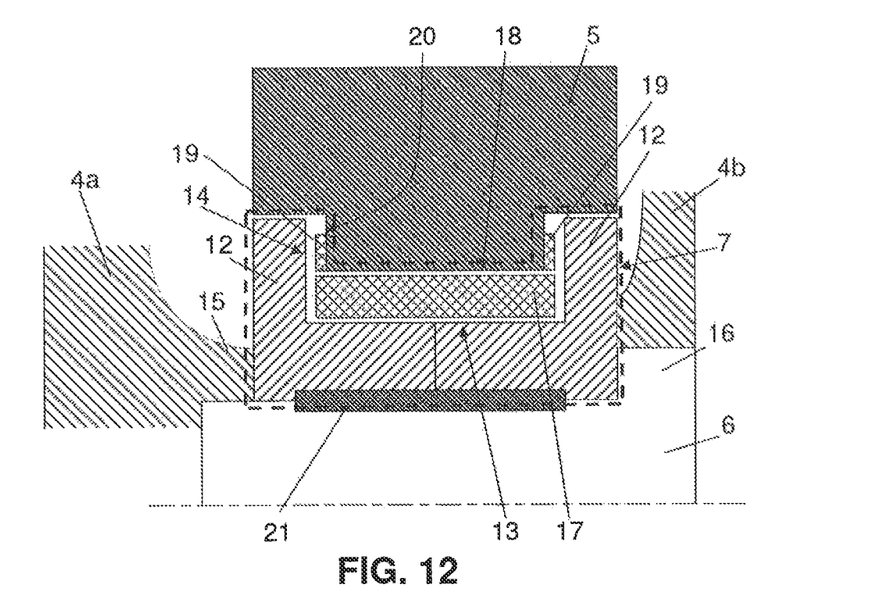

According to embodiments of the invention, the fixed L-shaped bushings 12 may be fixed against rotation with respect to the planet shaft 6 by means of a positioning element 21. FIG. 12 illustrates an example of such a positioning element 21. In this example the fixed L-shaped bushings 12 may be fixed against rotation with respect to the planet shaft 6 by means of a key 21 provided in a keyway in the planet shaft 6.

Figure 13:
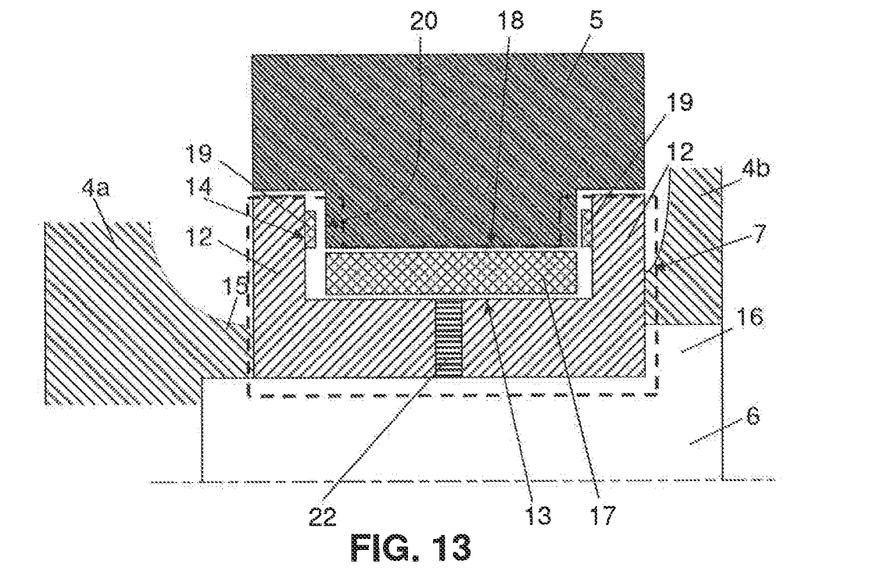
Figure 14:
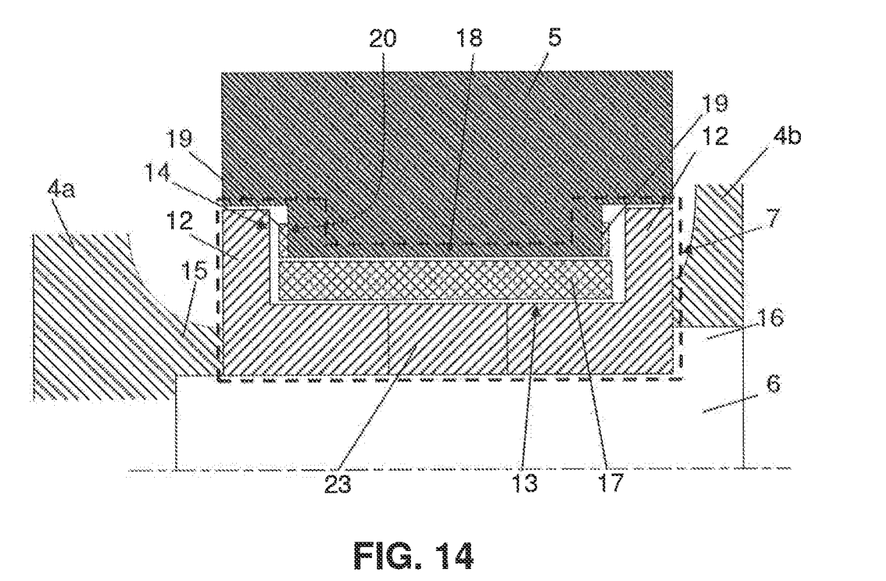

In the above described examples, the fixed L-shaped bushings 12 are fixedly connected together. This may be done by using, for example, bolts. However, according to other embodiments of the invention, a spacer 22 may be provided in between the two fixed L-shaped bushings 12 as is illustrated in FIG. 13. According to still further embodiments of the invention, at least one further bushing 23 may be present in between the fixed L-shaped bushings 12 (see FIG. 14). The at least one further bushing 23 may be fixedly connected to the planet shaft 6. According to embodiments of the invention and as illustrated in FIG. 14 the at least one further bushing 23 may be fixedly connected to the fixed L-shaped bushings 12 in a same way as described for the fixed connection between the fixed L-shaped bushings 12. In case more than one further bushing 23 is provided in between the fixed L-shaped bushings 12, the further bushings 23 may also mutually be fixedly connected. According to other embodiments of the invention, a spacer 22 may be present in between the further bushing 23 and each of the fixed L-shaped bushings 12. In case more than one further bushing 23 is present, a spacer 22 may also be present in between each of the neighboring further bushings 23.

Figure 15:
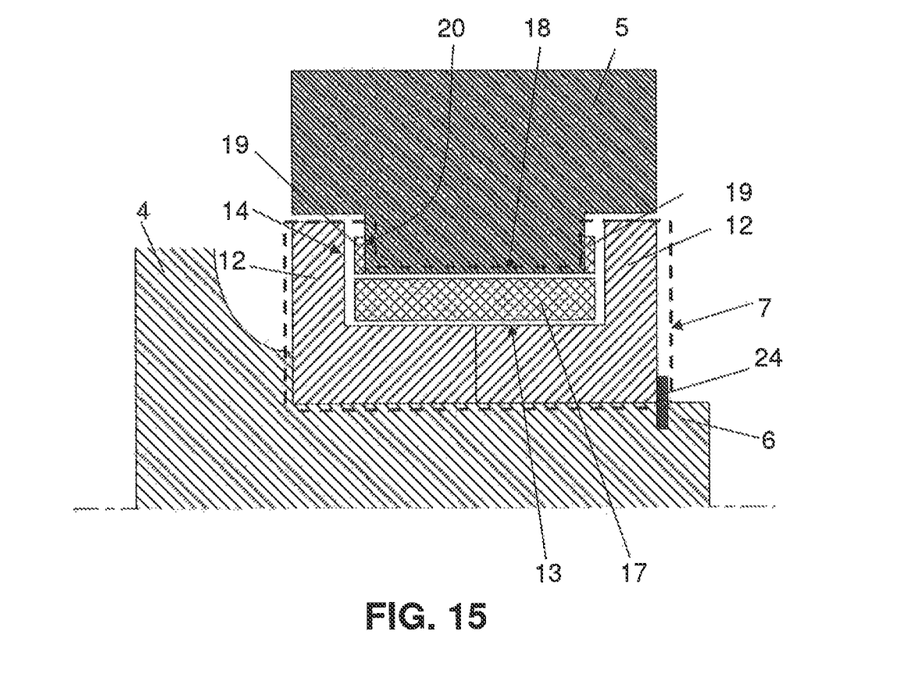

In the above described examples, the planet carrier 4 is a double flange or cage-type planet carrier 4 with two walls 4a, 4b. However, the planet carrier 4 can also be a single flange planet carrier 4 as is illustrated in FIG. 15. In such cases, the abutments for locking the L-shaped bushings 12 against rotation with respect to the planet shaft 6 are formed at one outer side by an abutment 15 of the planet carrier 4 and at the other outer side by a locking mechanism 24, in the example given a circlips 24. According to other embodiments the locking mechanism 24 may also be any other suitable locking mechanism as known by a person skilled in the art such as, for example but not limited to, a locking plate or a nut. In the example given in FIG. 15 the planet shaft 6 is integrally formed with the planet carrier 4, or in other words the planet carrier 4 and the planet shaft 6 are formed in one piece. It has to be noted that in the example given in FIG. 15 the radial sliding support 17 is formed by a floating bushing 17. However, the radial sliding support 17 may, as already described above, also be formed by a coating of plain bearing material provided on the radial contact surface 13 of the L-shaped bushings 12 and/or on the radial contact surface 18 of the planet gear 5. The axial sliding support 19 is formed by a coating 19 provided at the axial contact surface 20 of the planet gear 5. However, the axial sliding support 19 may also be formed by coating 19 provided on the axial contact surface 14 of the L-shaped bushings 12 or on both the axial contact surface 20 of the planet gear 5 and the axial contact surface 14 of the L-shaped bushings 12.

Figure 16:
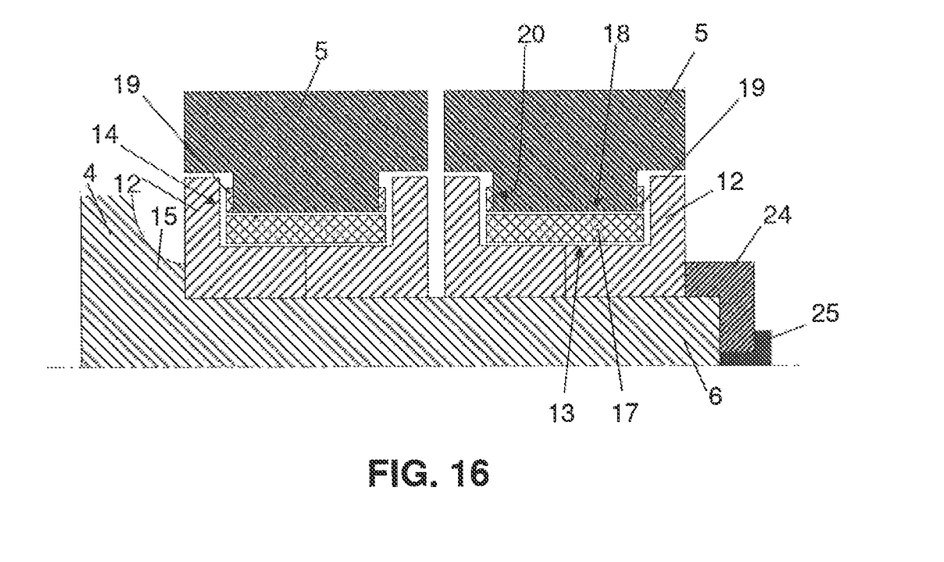

In all the above described embodiments, only one planet gear 5 is provided on each planet shaft 6. However, according to further embodiments of the invention, each planet shaft 6 may comprise more than one planet gear 5. FIG. 16 illustrates an example in which two planet gears 5 are provided on a same shaft. The planet gears 5 are provided directly next to each other. In the example given, the planet carrier 4 is a single flange planet carrier 4. According to this example, the abutments for locking the L-shaped bushings 12 are formed at one outer side by an abutment 15 of the planet carrier 4 and at the other outer side by a locking mechanism 24, which in this case is formed by a locking plate 24 which is fixed to the planet shaft 6 by means of a bolt 25. The locking mechanism 24 may also be formed by a circlips or a nut, as already described above. According to other embodiments, the planet carrier 4 may also be a double flange or cage-type planet carrier 4. Again, in the example given in FIG. 16 the radial sliding support 17 is formed by a floating bushing 17. However, the radial sliding support 17 may, as already described above, also be formed by a coating of plain bearing material provided on the radial contact surface 13 of the L-shaped bushings 12 and/or on the radial contact surface 18 of the planet gear 5. The axial sliding support 19 is formed by a coating 19 provided at the axial contact surface 20 of the planet gear 5. However, the axial sliding support 19 may also be formed by coating 19 provided on the axial contact surface 14 of the L-shaped bushings 12 or on both the axial contact surface 20 of the planet gear 5 and the axial contact surface 14 of the L-shaped bushings 12.

According to still further embodiments of the invention, more than two planet gears 5 may be provided on a same planet shaft 6 (not shown in the drawings).

Figure 17:
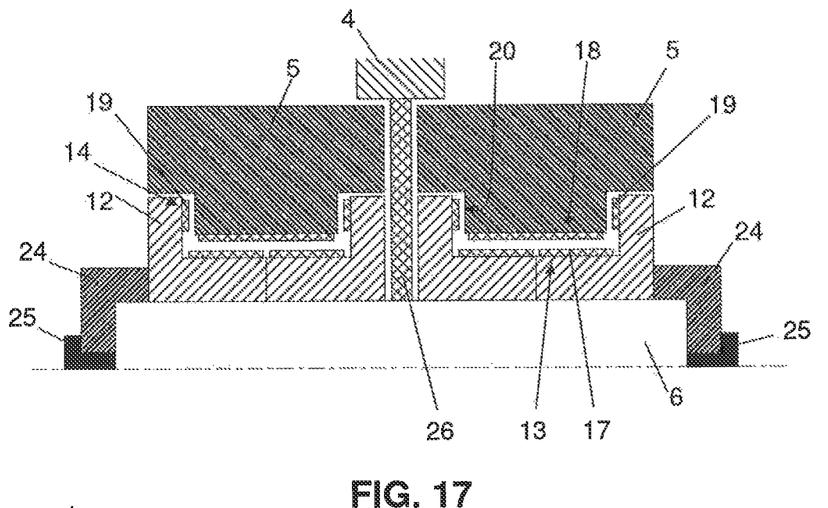

In still further embodiments, the planet carrier 4 may be provided with a backplate 26 (see FIG. 17).

According to a specific embodiment, the backplate 26 may be a bogie plate 26 on which the planet shafts 6 are mounted and which is connected to a remaining part of the planet carrier 4 by means of studs, each planet shaft 6 supporting a pair of planet gears 5, the planet gears 5 of each pair being mounted at opposite sites of the bogie plate 26. In this example, the abutments for locking the L-shaped bushings 12 are at both outer sides formed by a locking mechanism 24, more particularly by a locking plate 24 which is fixed to the planet shaft 6 by means of a bolt 25. However, any other suitable locking mechanism 24 such as for example a circlips or a nut can also be used with the present example for locking the L-shaped bushings 12.

It has to be understood that the embodiments described above by means of the drawings are not intended to limit the invention in any way. The properties described with respect to the different drawings and embodiments can be interchanged and/or used together.

For lubrication of a plain bearing arrangement 7 according to embodiments of the invention, conventional lubrications systems can be used as known by a person skilled in the art. For example, lubrication systems as described in EP 1 488 139 or in EP 1 767 814 can be used for lubricating a plain bearing arrangement 7 according to embodiments of the invention. Lubrication channels and oil pockets are preferably designed and located such that the best way of lubricating the plain bearing arrangement 7 is obtained.

In a planetary gear stage 2 according to embodiments of the present invention, a plain bearing arrangement 7 as described above may be used with all known types of planet carriers, such as a single flange planet carrier, a double flange planet carrier or a planet carrier comprising a backplate. So it provides an overall solution which is not limited to one kind of planet carrier, and thus is not limited to one kind of planetary gear stage.

Furthermore, in a planetary gear stage 2 according to embodiments of the present invention, the plain bearing arrangement 7 can be used with any size of planet gears 5, because the L-shaped bushings 12 can easily be adapted in size at their sides which are to be connected so as to form the U-shape, e.g. by grinding, or a spacer 22 or a further bushing 23 can be placed in between the L-shaped bushings.

Moreover, because the plain bearing arrangement 7 comprises two L-shaped bushings 12, they can more easily adapt to deformations of the planet gear 5, which leads to less wear and thus to a longer life time of the plain bearing arrangement 7.

Figure 18:
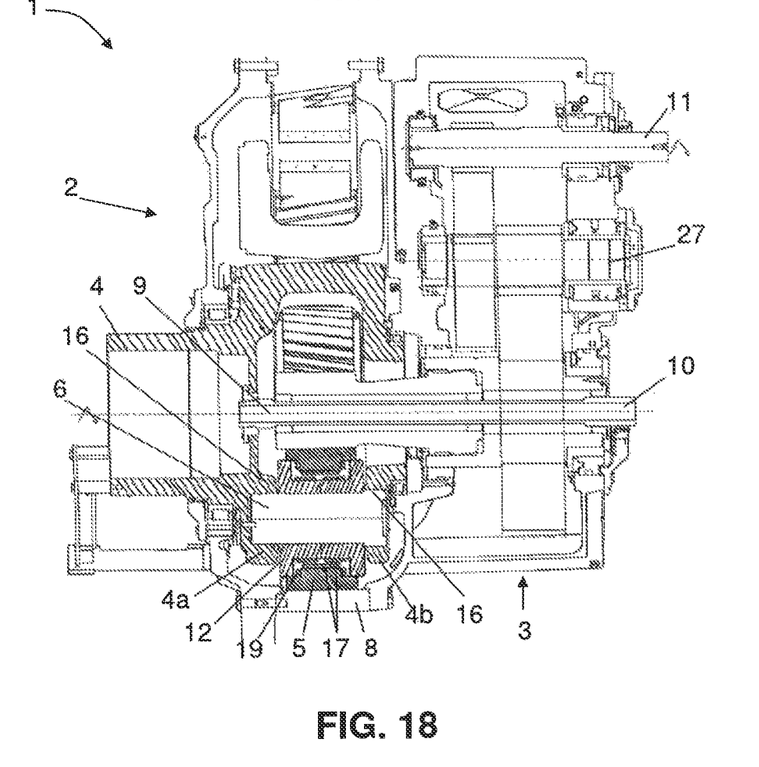
FIG. 18 illustrates a gearbox comprising a planetary gear stage according to an embodiment of the present invention.

In a second aspect, the present invention provides a gearbox 1 comprising at least one planetary gear stage 2 as described in the above embodiments. A gearbox 1 comprising a planetary gear stage 2 according to one embodiment of the invention is illustrated in FIG. 18. The gearbox 1 comprises one planetary gear stage 2 and a parallel gear stage 3. The parallel gear stage 3 comprises a low speed shaft 10, an intermediate shaft 27 and a high speed shaft 11.

The planetary gear stage 2 comprises a ring gear 8, a sun gear 9 and a planet carrier 4 for driving at least three planet shafts 6 each onto which a planet gear 5 is rotatably mounted by means of a plain bearing arrangement 7. The planet carrier 4 is a double flange or cage-type planet carrier 4 having two walls 4a, 4b in between which the planet gear 5 is mounted and where these walls 4a, 4b support the planet shafts 6 on either side of the planet gear 5.

The L-shaped bushings 12 are mounted together to form a cross-sectional U-shape and are locked in axial direction at one outer side by an abutment 15 of the planet carrier 4 and at the other outer side by a collar 16 of the planet shaft 6.

In the example given in FIG. 18 the plain bearing arrangement 7 comprises a radial sliding support 17 formed by a coating 17 on the radial contact surface of the L-shaped bushings 12 and on the radial contact surface of the planet gear 5. The axial sliding support 19 is formed by a coating 19 provided on the axial contact surface of the planet gear 5.

It has to be understood that FIG. 18 is only for the ease of illustration and is not intended to limit the invention in any way. Any other planetary gear stage 7 as described in the above embodiments can be used in the gearbox 1 illustrated in FIG. 18. Also, the radial sliding support 17 and the axial sliding support 19 may be formed in any other way as described in the embodiments above. Furthermore, the planet carrier 4 may also be a single flange planet carrier or may be a planet carrier comprising a backplate, e.g. bogie plate. The gearbox 1 may comprise two planetary gear stages 2a, 2b of which at least one is a planetary gear stage 2 according to embodiments of the present invention. Moreover, the parallel gear stage 3 may, in stead of a low speed shaft 10, an intermediate shaft 27 and a high speed shaft 11, only comprise a low speed shaft 10 and a high speed shaft 11.

The invention claimed is:

1. A planetary gear stage (2) for a gearbox (1), the planetary gear stage (2) comprising:
a ring gear (8), a sun gear (9) and a planet carrier (4) for driving at least three planet shafts (6), at least one planet gear (5) is rotatably mounted on each of the at least three planet shafts by a respective plain bearing arrangement (7), and each of the planet gears (5) having a radial contact surface (18) and an axial contact surface (20),
each of the plain bearing arrangements (7) comprising:
two bushings (12) fixedly connected to the planet shaft (6), each of the two fixed bushings (12) being L-shaped in cross-section and having a radial contact surface (13) and an axial contact surface (14), the fixed L-shaped bushings (12) being mounted to form a cross-sectional U-shape and being locked in an axial direction at both outer sides by an abutment (15, 16, 24), and at least part of the planet gear (5) is located within the U-shape formed by the fixed L-shaped bushings (12),
a radial sliding support (17) arranged directly in between the radial contact surface (13) of the fixed L-shaped bushings (12) and the radial contact surface (18) of the planet gear (5), and
an axial sliding support (19) arranged in between the axial contact surface (14) of the fixed L-shaped bushings (12) and the axial contact surface (20) of the planet gears (5).

2. The planetary gear stage (2) according to claim 1, wherein a contact surface angle (a) of the axial contact surfaces (14, 20) of the fixed L-shaped bushings (12) and the planet gear (5) is between +0.2° and +2.5° from an axis that is perpendicular to the radial contact surface of the planet gear.

3. The planetary gear stage (2) according to claim 2, wherein the contact surface angle (a) of the axial contact surfaces (14, 20) of the fixed L-shaped bushings (12) and the planet gear (5) is between +0.5° and +1.5° from the axis that is perpendicular to the radial contact surface of the planet gear.

4. The planetary gear stage (2) according to claim 1, wherein the L-shaped bushings (12) having a width (W) and the planet shaft (6) having a diameter (d), and a ratio of the width (W) of the L-shaped bushings (12) to the diameter (d) of the planet shaft (6) is either equal to or larger than 0.3.

5. The planetary gear stage (2) according to claim 1, wherein the L-shaped bushings (12) having a width (W) and the planet shaft (6) having a diameter (d), and a ratio of the width (W) of the L-shaped bushings (12) to the diameter (d) of the planet shaft (6) is either equal to or larger than 0.5.

6. The planetary gear stage (2) according to claim 1, wherein the L-shaped bushings (12) axially abut each other and are fixed against rotation with respect to the planet shaft (6) by a positioning element (21) which engages both of the fixed L-shaped bushings.

7. The planetary gear stage (2) according to claim 6, wherein the positioning element (21) is a key provided in a keyway in the planet shaft (6).

8. The planetary gear stage (2) according to claim 1, wherein the fixed L-shaped bushings (12) are fixedly connected together and have axial sides that abut each other.

9. The planetary gear stage (2) according to claim 1, wherein the plain bearing arrangement (7) comprises a spacer (22) arranged in between the fixed L-shaped bushings (12), and the spacer abuts axial sides of the fixed L-shaped bushings and axially separates the fixed L-shaped bushings from each other.

10. The planetary gear stage (2) according to claim 1, wherein the plain bearing arrangement (7) comprises at least one further bushing (23) that is axially located between the fixed L-shaped bushings (12), and the at least one further bushing axially separates the fixed L-shaped bushings from each other.

11. The planetary gear stage (2) according to claim 1, wherein opposed axial ends of the radial sliding support (17) are axially spaced from the respective axial contact surfaces (14) of the fixed L-shaped bushings (12) by gaps, and the radial sliding support comprises a coating (17) of plain bearing material provided at least on the radial contact surface (13) of the L-shaped fixed bushings (12).

12. The planetary gear stage (2) according to claim 1, wherein the axial sliding support (19) comprises a coating (19) of plain bearing material provided on at least one of:
the axial contact surface (14) of the fixed L-shaped bushings (12), and
the axial contact surface (20) of the planet gears (5).

13. The planetary gear stage (2) according to claim 1, wherein the planet carrier (4) is a double flange planet carrier.

14. The planetary gear stage (2) according to claim 13, wherein the abutments for locking the L-shaped bushings (12) in the axial direction are formed at one outer side by an abutment (15) of the planet carrier (4) and at the other outer side by a collar (16) of the planet shaft (6).

15. The planetary gear stage (2) according to claim 1, wherein the planet carrier (4) is a single flange planet carrier.

16. The planetary gear stage (2) according to claim 15, wherein the abutments for locking the L-shaped bushings (12) in the axial direction are formed at one outer side by an abutment (15) of the planet carrier (4) and at the other outer side by a locking mechanism (24).

17. The planetary gear stage (2) according to 1, wherein the planet carrier (4) comprises a backplate (26).

18. The planetary gear stage (2) according to claim 17, wherein the abutments for locking the L-shaped bushings (12) in the axial direction are formed, at both outer sides, by a locking mechanism (24).

19. The planetary gear stage (2) according to claim 1, wherein at least two planet gears (5) are rotatably mounted on a common planet shaft (6).

20. The planetary gear stage (2) according to claim 1, wherein the planetary gear stage (2) is incorporated into a gearbox (1) of a wind turbine.

21. A planetary gear stage (2) for a gearbox (1), the planetary gear stage (2) comprising:
a ring gear (8), a sun gear (9) and a planet carrier (4) for driving at least three planet shafts (6), at least one planet gear (5) is rotatably mounted on the at least three planet shaft by a plain bearing arrangement (7), and each of the planet gears (5) having a radial contact surface (18) and an axial contact surface (20),
each of the plain bearing arrangements (7) comprising:
two bushings (12) fixedly connected to the planet shaft (6), each of the two fixed bushings (12) being L-shaped in cross-section and having a radial contact surface (13) and an axial contact surface (14) the fixed L-shaped bushings (12) being mounted to form a cross-sectional U-shape and being locked in an axial direction at both outer sides by an abutment (15, 16, 24), and at least part of the planet gear (5) is located within the U-shape formed by the fixed L-shaped bushings (12),
a radial sliding support (17) arranged in between the radial contact surface (13) of the fixed L-shaped bushings (12) and the radial contact surface (18) of the planet gear (5),
an axial sliding support (19) arranged in between the axial contact surface (14) of the fixed L-shaped bushings (12) and the axial contact surface (20) of the planet gears (5); and
the radial sliding support (17) comprises at least one free-rotating bushing (17).

22. The planetary gear stage (2) according to claim 21, wherein the at least one free-rotating bushing (17) is formed of a plain bearing material.

23. The planetary gear stage (2) according to claim 21, wherein the at least one free-rotating bushing (17) is formed of either steel or steel coated with a plain bearing material.

* * * * *